United States Patent [19]

Dunsmore et al.

[11] Patent Number: 5,276,477
[45] Date of Patent: Jan. 4, 1994

[54] CAMERA DISPLAY CIRCUIT

[75] Inventors: Clay A. Dunsmore, Fairport; Glenn W. Johnson, Webster, both of N.Y.

[73] Assignee: Eastman Kodak Company, Rochester, N.Y.

[21] Appl. No.: 33,219

[22] Filed: Mar. 18, 1993

[51] Int. Cl.⁵ .................. G03B 17/18; G03B 15/02
[52] U.S. Cl. ........................... 354/471; 354/127.12
[58] Field of Search ............ 354/127.12, 471, 472, 354/473, 474, 475, 484

[56] References Cited

U.S. PATENT DOCUMENTS

| | | | |
|---|---|---|---|
| 4,250,413 | 2/1981 | Kawasaki et al. | 307/293 |
| 4,269,496 | 5/1981 | Motoori et al. | 354/267 |
| 4,350,426 | 9/1982 | Urata | 354/234 |
| 4,430,602 | 2/1984 | Ohmori | 315/241 |
| 4,522,479 | 6/1985 | Yamada et al. | 354/413 |
| 5,101,335 | 3/1992 | Ludden et al. | 363/21 |

Primary Examiner—Michael L. Gellner
Assistant Examiner—Nicholas J. Tuccillo
Attorney, Agent, or Firm—Francis H. Boos, Jr.

[57] ABSTRACT

A camera in accordance with the invention includes a display circuit that uses the decay voltage of a storage capacitor to determine the time interval during which an information display of the camera will be illuminated. When the storage capacitor decay voltage falls below a predetermined value, power to the information display is removed. The storage capacitor is used to power another camera system and therefore is not an additional component necessary for the display circuit alone.

18 Claims, 4 Drawing Sheets

CAMERA DISPLAY CIRCUIT

BACKGROUND OF THE INVENTION

1. Field of the Invention

The present invention relates generally to information displays for photographic cameras and, more particularly, to controlling the illumination of such information displays.

2. Description of the Related Art

Many conventional photographic cameras provide information displays to communicate information to the camera user. The information displayed can comprise, for example, the number of exposed frames on the film-strip loaded in the camera, the present shutter speed and aperture setting, the lens setting, the charging condition of the flash unit, and the like. Typically, such information displays are a type of liquid crystal display (LCD) that are illuminated by power from an energy source, such as a camera battery.

It is advantageous to provide power to the LCD constantly whenever the camera is turned on or is otherwise placed in an active state. If the camera battery is used to power the display, however, operation of camera systems such as the flash unit or the film advance motor can cause flickering of the display. These problems can be somewhat alleviated by adding a large filter capacitor, but this can add size, weight, and expense to the camera. Moreover, supplying the display with power from the camera battery can unacceptably shorten the life of the camera battery. Therefore, cameras that provide constant power to the LCD often include a dedicated LCD battery. Again, however, this adds size, weight, and expense to the camera.

Some cameras include a regulated power supply that is coupled to the camera battery and can constantly supply power to the LCD. Operating the regulated power supply, however, can require a significant current that can quickly drain the camera battery and unacceptably shorten the battery life. An alternative to constantly operating the regulated power supply to illuminate a camera information display is to turn off the power supply or otherwise remove power from the display after a predetermined time interval. Removing display power when the camera is activated, or turned on, is frequently known as providing a "ready" interval or "doze" mode. A user action, such as partly depressing a shutter button, halts the doze mode and restores power to the display. Removing power after a relatively small time interval is not as convenient to the camera user. For increased operating convenience, the predetermined time interval is set to a reasonably extended time, such as one or two hours, to ensure that the display will be illuminated and readily available to the user under most picture-taking situations without the user first pressing the shutter button to illuminate the display. The one to two-hour time interval does not unnecessarily drain the camera battery.

To provide the proper time interval, the camera can include a dedicated timer. The timer is typically started by the completion of an exposure taking sequence. If no additional exposure or other camera operation is performed by the user before the expiration of the time interval, power to the LCD is removed. Thus, the camera battery will not be unnecessarily drained when the camera is not in active use. Such display timers, however, typically require controllers with additional electronic components, such as flip-flops or R-C timing circuits. See, for example, U.S. Pat. No. 4,522,479 to Yamada and U.S. Pat. No. 4,269,496 to Motoori. Such additional components can increase camera cost and complexity.

From the discussion above, it should be apparent that there is a need for a photographic camera information display circuit that removes power from the display after a substantially predetermined time interval has elapsed, without using an additional dedicated display timing circuit or other complicated circuitry or additional components. The present invention satisfies this need.

SUMMARY OF THE INVENTION

In accordance with the invention, a photographic camera display circuit, adapted to receive electrical energy from a power source, includes (1) a storage capacitor that provides stored electrical energy to a camera system, (2) a capacitor voltage sensor that is coupled to the storage capacitor and that can indicate the voltage of the storage capacitor, (3) a display device that receives electrical energy from the power source, and (4) a display controller that is coupled to the display device and that controls the application of energy from the power source to the display device, wherein the display controller responds to the capacitor voltage sensor by halting the application of energy from the power source to the display device when the sensor indicates that the storage capacitor voltage is below a predetermined value.

A camera in accordance with the invention includes a display circuit that provides a display timing function by using the bleed-down voltage of a storage capacitor of the camera to determine the time interval during which an information display of the camera receives illuminating power. When the voltage of the storage capacitor falls below a predetermined level, power to the information display is removed. The storage capacitor is provided independently of the display. That is, the storage capacitor is provided in the camera to power another camera system and therefore is not an additional component necessary for the display circuit alone. A display circuit in accordance with the invention thereby eliminates excessive drain on the camera battery and provides a display timing function without additional electrical components.

The storage capacitor, for example, can be used to power a flash unit of the camera while the camera battery provides electrical power to the information display. After each exposure, the storage capacitor of the flash unit is charged to its flash voltage value by a high voltage DC-to-DC converter. After a time interval with no exposure being taken, the charged voltage of the flash storage capacitor falls below a predetermined value, at which time the display circuit removes electrical power from the information display.

The high voltage DC-to-DC converter can include a primary winding that is coupled to the battery and a secondary winding that is coupled to the storage capacitor. Rather than being connected directly to the storage capacitor, the voltage sensor can be coupled to the primary winding of the DC-to-DC converter and therefore, during charging, can indirectly sense the voltage of the capacitor. When the voltage sensor detects that the capacitor voltage has fallen below a predetermined level, power to the information display is removed. Alternatively, the capacitor voltage sensor can be a zener diode that conducts current when the storage capacitor voltage is above the predetermined level, thereby indicating that power is to be removed from the display.

Other features and advantages of the present invention should be apparent from the following description of the preferred embodiments, which illustrate, by way of example, the principles of the invention.

DESCRIPTION OF THE PREFERRED EMBODIMENTS

Figure 1:
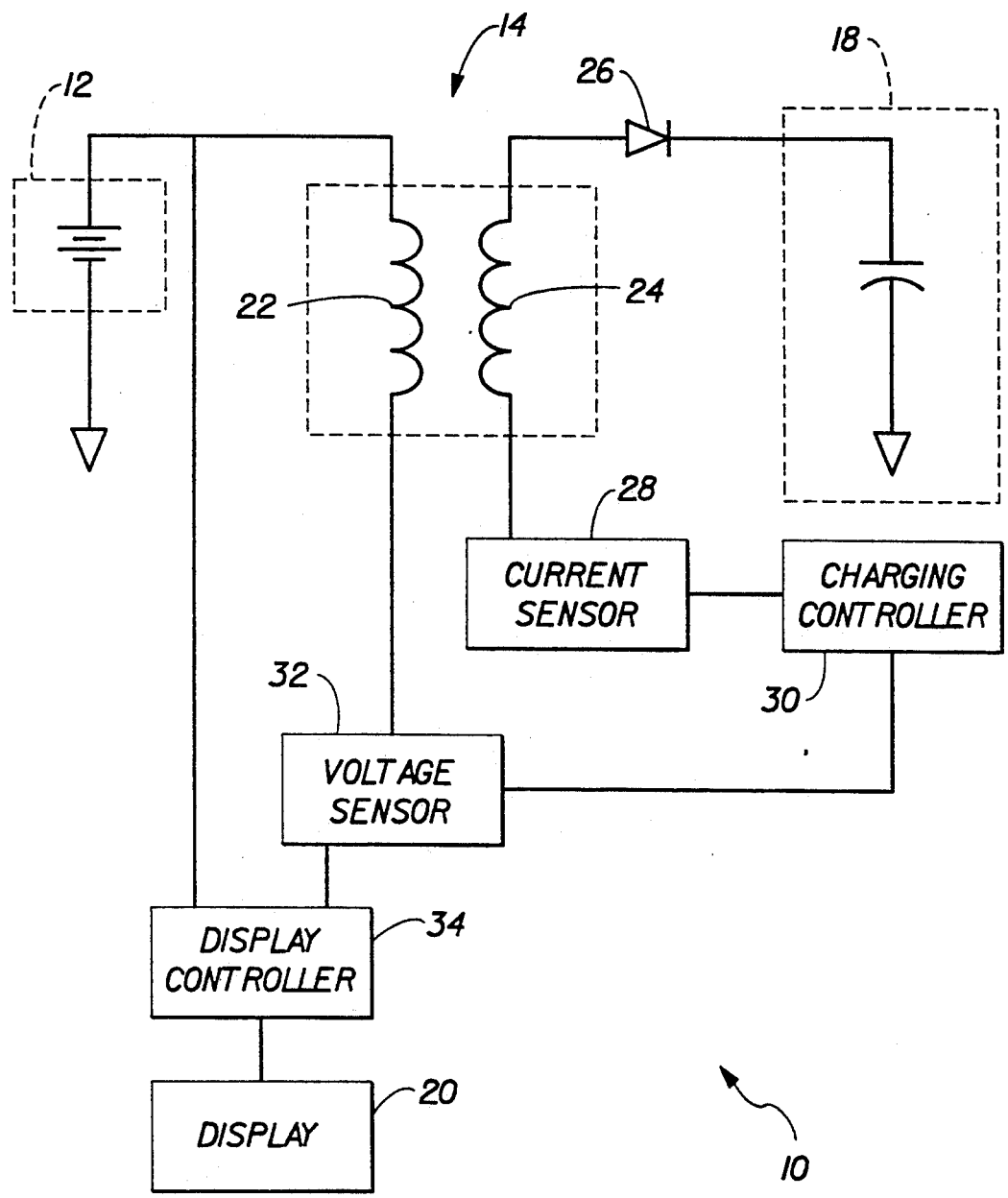
FIG. 1 is a diagram of a first display circuit of a camera constructed in accordance with the present invention.

Turning now to FIG. 1, a camera display circuit 10 receives electrical power from a camera battery 12 and includes a DC-to-DC power converter 14 that supplies a storage capacitor 16 with relatively high voltage. The stored energy of the storage capacitor is used to power a camera system, such as a flash unit 18. The camera battery also provides power to a camera information display 20. After the storage capacitor 16 is fully charged, the voltage across the storage capacitor will gradually decay, or bleed down, and eventually will reach zero voltage. In accordance with the present invention, the time interval required for the storage capacitor voltage to decay to a predetermined voltage level defines the time interval during which the camera display 20 is supplied with power from the camera battery. In this way, the storage capacitor 16 determines the display time interval. Because the storage capacitor is provided for the camera flash unit 18, the display timing function does not require additional components such as additional timing flip-flops, R-C timing circuits, or the like.

In the FIG. 1 embodiment, the camera battery 12 supplies a voltage of approximately three to six volts, which typically is boosted by the DC-to-DC power converter 14 to approximately 325 volts and then is supplied to the storage capacitor 16 of the flash unit 18. In the preferred embodiment, the power converter comprises a transformer having a primary winding 22 and a secondary winding 24, which are oppositely wound. The converter is coupled to the storage capacitor 16 by a high-voltage diode 26. A current sensor 28 detects the current in the secondary winding circuit and provides a signal to a charging controller 30, which controls activation of the power converter. A voltage sensor 32 senses the primary winding circuit voltage and therefore indirectly senses the voltage across the storage capacitor 16 during charging. A similar charging arrangement is described in U.S. Pat. No. 5,101,335 to C. Ludden and C. Dunsmore, also assigned to Eastman Kodak Company, which describes the current sensor 28, charging controller 30, and voltage sensor 32 in greater detail and which is incorporated herein by this reference.

The display circuit 10 also includes a display controller 34, which is coupled to the battery 12 and controls the application of power from the battery to the display 20. When the voltage sensor 32 indicates that the voltage of the storage capacitor 16 is below the predetermined level, the display controller 34 removes power from the display. The predetermined voltage level can be selected in accordance with the desired time interval. It has been found that a predetermined voltage level of 280 volts will be reached in one to two hours and is the level selected for the preferred embodiment. In the preferred embodiment, the display 20 comprises a liquid crystal-type display, but other displays can be satisfactorily used.

After the storage capacitor 16 initially reaches full charge, approximately 325 volts, operation of the power converter 14 is halted (as described in the above-referenced U.S. Pat. No. 5,101,335) and a decay interval begins. During the decay interval, the charge on the storage capacitor is allowed to decay. After approximately ten seconds, the decay interval ends and the power converter is activated for a brief charging interval of, for example, 500 microseconds. During the charging interval, the voltage of the storage capacitor is sensed. Another ten-second decay interval then begins, and the process repeats until the predetermined voltage level is sensed, at which time power is removed from the display 20.

Figure 2:
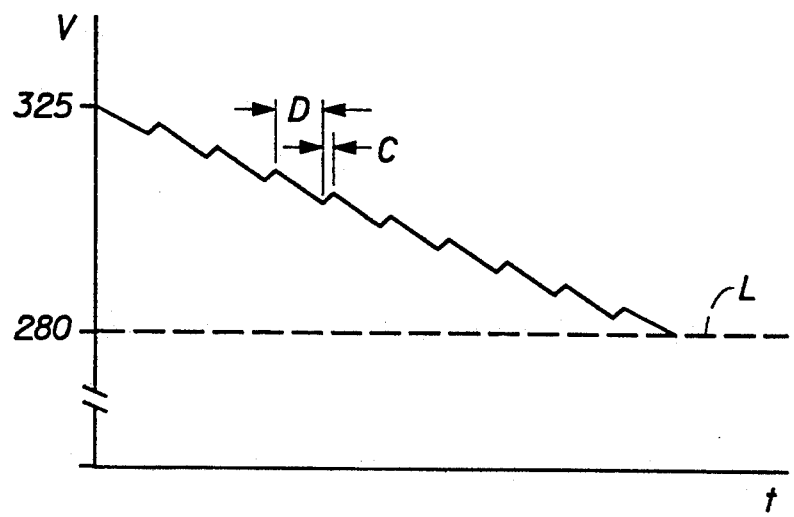
FIG. 2 is a graph of the storage capacitor voltage for the display circuit illustrated in FIG. 1.

In the FIG. 1 embodiment, the charging interval permits the voltage sensor 32 to sense the voltage of the storage capacitor 16. Although activation of the power converter will increase the voltage of the storage capacitor by a small amount, the charging interval is kept sufficiently short to permit a gradual decay of the storage capacitor voltage from the full charge level of approximately 325 volts to the predetermined level of 280 volts. This operation is illustrated in FIG. 2, which is a graph of the storage capacitor voltage as a function of time. The voltage gradually decays from the full charge level to the predetermined level, despite the brief charging intervals, in approximately one to two hours.

The FIG. 2 graph shows that the capacitor voltage decays, or bleeds down, from a maximum value toward the predetermined level L in a general declining sawtooth pattern. The sawtooth pattern is caused by the 10-second decay intervals, one of which is identified on the graph by the letter D, and also by the 500-microsecond charging intervals, one of which is identified with the letter C. The respective time intervals are not drawn to scale, for purposes of illustration.

It will be appreciated from FIG. 2 that the relative extent of the decay intervals D and the charging intervals C will determine the length of time necessary for the capacitor voltage to bleed down to the predetermined level L. Thus, the relative extent of the two intervals can be adjusted to provide the desired bleed-down time and therefore provide the desired display time. Increasing the charging interval time will increase the time needed for the capacitor voltage to bleed down to the level L. If the charging interval C is sufficiently long relative to the decay interval D, then the capacitor voltage will not bleed down sufficiently before the beginning of the succeeding charging interval C, in which case the capacitor voltage will rise rather than gradually bleed down. Thus, the charging interval C should be selected such that the capacitor voltage at the end of any one charging interval is less than the capacitor voltage at the beginning of the preceding decay interval D. Just such a situation is illustrated in FIG. 2.

Figure 3:
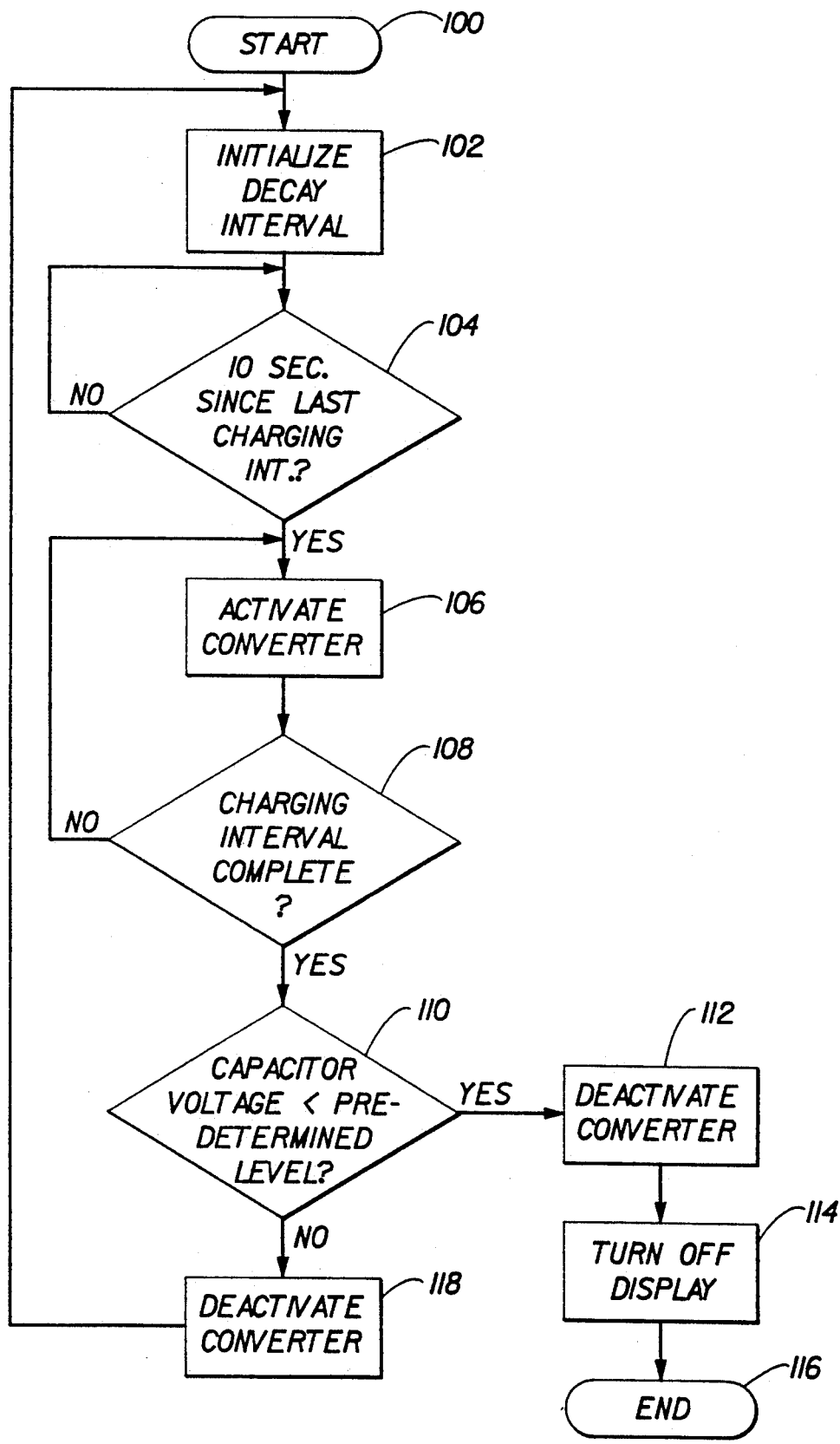
FIG. 3 is a flowchart that shows the operation of the display circuit illustrated in FIG. 1.

FIG. 3 is a flowchart of the operation of the display circuit 10 illustrated in FIG. 1. After the storage capacitor 16 of the display circuit 10 is fully charged, which occurs when the camera containing the circuit is initially activated and after each exposure sequence, the operation of the display circuit begins at the flowchart box numbered 100. At the box numbered 102, the decay interval is initialized. In the FIG. 1 embodiment, a decay interval of approximately ten seconds is allowed to elapse between the end of one charging interval and the beginning of a next charging interval. Such time intervals are typically provided by a variety of camera systems. For example, most cameras include timing circuits that implement a shutter self-timer function for a 10-second delay of the shutter. In this way, the preferred embodiment avoids using dedicated timing circuits for control of the information display. Thus, the display circuit 10 checks for the passage of ten seconds since the last charging interval at the box numbered 104.

If ten seconds have elapsed since the last charging interval, then at the flowchart box numbered 106 the charging controller 30 charges the storage capacitor 16 by activating the converter 14 for a very short period of time, typically on the order of 500 microseconds. Again, such short timing intervals are typically provided in the camera for other purposes, and can be provided by, for example, a portion of the shutter self-timer circuit. The charging controller 30 next checks to determine if the 500-microsecond charging interval has been completed at the box numbered 108 in FIG. 3. If the charging interval is not completed, then the converter 14 continues to be activated at the box numbered 106. As noted above in connection with the description of FIG. 1, the voltage sensor 32 senses the capacitor voltage during the charging by the converter 14. Therefore, when the 500-microsecond charging interval has been completed, the display controller 34 checks the capacitor voltage at the flowchart box numbered 110 to determine if the capacitor voltage is less than the predetermined level.

At the box numbered 110, if the capacitor voltage is less than the predetermined level, then the converter 14 is deactivated at the next flowchart box 112 and the display controller 34 halts the application of power from the camera battery to the display 20 at the box numbered 114. The display timer function is completed at the box numbered 116. If the capacitor voltage is not less than the predetermined level at flowchart box 110, then the converter is deactivated at box 118 before the decay interval is reset at the box numbered 102 to start the process again.

Figure 4:
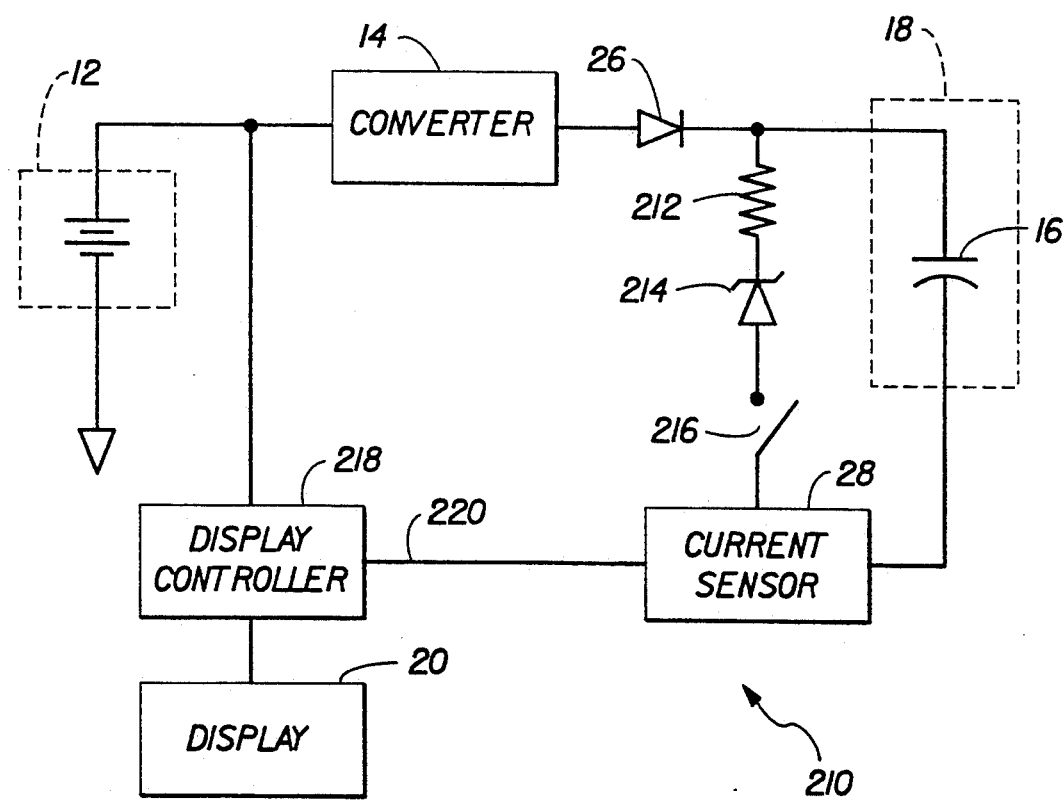
FIG. 4 is a diagram of a second display circuit constructed in accordance with the present invention.

Another embodiment of a display circuit in accordance with the present invention is illustrated in FIG. 4. The display circuit 210 illustrated in FIG. 4 includes a high-voltage converter 14 such as described in connection with the circuit illustrated in FIG. 1. The converter 14 is coupled to the storage capacitor 16 of a camera system 18 via a high-voltage diode 26, as with FIG. 1. In the FIG. 4 embodiment, however, the capacitor voltage is checked against the predetermined voltage level by the combination of a current sensor 28 and a series connection of a resistor 212, a zener diode 214, and an electronic switch 216. A display controller 218 controls the operation of the electronic switch. In accordance with the present invention, the capacitor voltage gradually decays over time to a predetermined level, whereupon the information display 20 is turned off. Again, the storage capacitor 16 is already provided for another camera system, such as a flash unit 18, thereby reducing the cost of implementing the display timing function.

The FIG. 4 embodiment operates as follows. The storage capacitor 16 is charged initially to its rated voltage of approximately 325 volts. The zener diode 214 is selected so the charged voltage of 325 volts is higher than the zener diode breakdown voltage. Therefore, the storage capacitor 16 initially conducts current when the electronic switch 216 is closed. The flow of current is sensed by the current sensor 28, which indicates current flow by producing a current signal that is, for example, set to a high level. Those skilled in the art will appreciate that the electronic switch 216 is closed only momentarily, just sufficient for operation of the current sensor 28. At the end of a predetermined checking time, such as ten seconds, the current sensor 28 provides a signal to the display controller 218 via a signal line 220. As noted above, time intervals such as ten seconds typically are provided for camera functions such as a shutter self-timer and therefore the circuitry needed for the display timing function is reduced.

Figure 5:
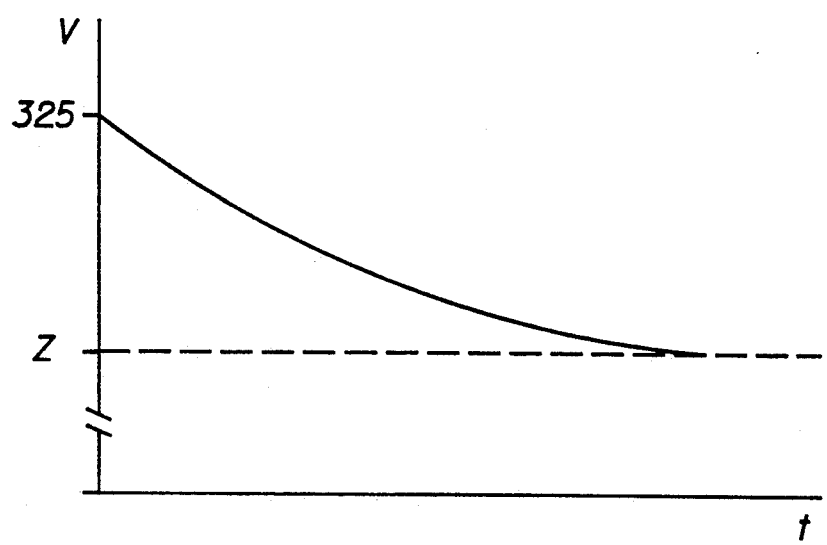
FIG. 5 is a graph of the storage capacitor voltage for the display circuit illustrated in FIG. 4.

When the voltage of the storage capacitor 16 decays to a voltage level below the breakdown voltage of the zener diode 214, the zener diode no longer conducts current. Therefore, at the end of the next ten-second checking time, the signal from the current sensor 28 will indicate that no current is flowing, for example, by being set low. The display controller 218 responds to this low signal by removing power from the display 20 and opening the electronic switch 216. At the next initialization of the display timing function, such as after a next exposure is taken, the storage capacitor 16 will again be fully charged and the electronic switch will be closed. In the FIG. 4 embodiment, the zener diode 214 is selected to have a breakdown voltage such that the storage capacitor voltage will decay to the breakdown voltage after approximately one to two hours. This feature is illustrated in FIG. 5, which is a graph of the storage capacitor voltage as a function of time. The breakdown voltage of the zener diode 214 is indicated by the line labelled Z.

In either of the two embodiments described above, a display circuit in accordance with the present invention uses the decay voltage of the storage capacitor to determine the time interval during which the information display of the camera will be illuminated. Because the storage capacitor also is used to power another camera system, the storage capacitor is not an additional component that is necessary for the display circuit alone. Moreover, timing circuits provided for other camera functions, such as a shutter self-timer, can be used to control the voltage checking cycle, saving other additional components. Implementing the ten-second intervals, for example, easily could require ten to twenty flip-flops. Therefore, the present invention provides a display timing function that reduces battery consumption and reduces the need for extra components.

The present invention has been described above in terms of presently preferred embodiments so that an understanding of the present invention can be conveyed. There are, however, many configurations of camera display circuits that are not specifically described herein, but with which the present invention is applicable. For example, a display circuit can use the build-up voltage of the storage capacitor to determine the time interval during which the information display of the camera will be illuminated, rather than using the decay voltage to determine the interval. The present invention should therefore not be seen as limited to the particular embodiments described herein, but rather, it should be understood that the present invention has wide applicability with respect to display circuits in a variety of applications. All modifications, variations, or equivalent arrangements that are within the scope of the attached claims should therefore be considered to be within the scope of the invention.

We claim:

1. A photographic camera display circuit, adapted to receive electrical energy from a power source, the circuit comprising:
    a storage capacitor that provides stored electrical energy to a camera flash system;
    a capacitor voltage sensor that is coupled to the storage capacitor and that can indicate the voltage of the storage capacitor;
    a display device that receives electrical energy from the power source; and
    a display controller that is coupled to the display device and that controls the application of energy from the power source to the display device, wherein
    the display controller responds to the capacitor voltage sensor by halting the application of energy from the power source to the display device when the sensor indicates that the storage capacitor voltage is below a predetermined value.

2. A display circuit as defined in claim 1, wherein:
    the circuit further includes a charging controller that controls the application of energy to the storage capacitor; and
    the capacitor voltage sensor is a voltage sensor of the indirect type and is coupled to the storage capacitor by the charging controller.

3. A display circuit as defined in claim 2, wherein the charging controller provides an output signal to the voltage sensor that indicates when the storage capacitor voltage is below the predetermined value.

4. A display circuit as defined in claim 2, wherein:
    the charging controller provides a charging current to the storage capacitor for a predetermined charging interval; and
    the display controller initiates a charging interval after the expiration of a predetermined decay interval.

5. A display circuit as defined in claim 4, wherein the decay interval is greater than the charging interval.

6. A display circuit as defined in claim 1, wherein the capacitor voltage sensor comprises a zener diode that conducts current when the storage capacitor voltage is above the predetermined level.

7. A display circuit as defined in claim 1, wherein:
    the circuit further includes a charging controller that controls the application of energy to the storage capacitor and that provides a charging current to the storage capacitor for a predetermined charging interval; and
    the display controller responds to the capacitor voltage sensor a predetermined decay interval after expiration of the charging interval.

8. A display circuit as defined in claim 7, wherein the decay interval is greater than the charging interval.

9. A photographic camera display circuit, adapted to receive electrical energy from a power source, the circuit comprising:
    DC-to-DC converter means for boosting the voltage from the power source, the converter means including a transformer having a primary winding circuit and a secondary winding circuit;
    a flash system storage capacitor that is coupled to the secondary winding circuit of the DC-to-DC converter means;
    voltage sensor means, coupled to the DC-to-DC converter means, for determining the voltage of the storage capacitor;
    a display device that receives power from the power source; and
    a display controller that controls the application of power from the power source to the display device and that responds to the storage capacitor voltage determined by the voltage sensor means by halting the application of power from the power source to the display device when the storage capacitor voltage is below a predetermined value.

10. A photographic camera display circuit, adapted to receive electrical energy from a power source, the circuit comprising:
    DC-to-DC converter means for boosting the voltage from the power source, the converter means including a transformer having a primary winding circuit and a secondary winding circuit;
    a storage capacitor that is coupled to the secondary winding circuit of the DC-to-DC converter means and to a flash operating system of the photographic camera;
    a zener diode that is coupled to the storage capacitor and that conducts current when the storage capacitor voltage is above the predetermined level;
    a display device that receives power from the power source;
    current sensing means, coupled to the storage capacitor, for sensing current flow and producing a current flow signal that indicates when current flow is sensed; and
    a display controller that controls the application of power from the power source to the display device and that responds to the current flow signal by halting the application of power from the power source to the display device when the current flow signal indicates that no current is flowing.

11. A display circuit as defined in claim 10, wherein:
    the circuit further includes a charging controller that controls the application of energy to the storage capacitor and that provides a charging current to the storage capacitor for a predetermined charging interval; and
    the display controller responds to the capacitor voltage sensor a predetermined decay interval after expiration of the charging interval.

12. A display circuit as defined in claim 11, wherein the decay interval is greater than the charging interval.

13. A method of controlling the illumination of an information display of a photographic camera having a storage capacitor that receives electrical energy from a camera power source and powers a camera flash system, the method comprising the steps of:
    charging the storage capacitor to a fully charged condition at a predetermined capacitor voltage;
    illuminating the information display;
    sensing the capacitor voltage;

determining when the capacitor voltage has decayed below a predetermined level; and halting the illumination of the information display in response to the decay of the capacitor voltage below the predetermined level.

14. The method as recited in claim 13, wherein the camera system powered by the storage capacitor comprises a flash unit.

15. The method as recited in claim 13, wherein the step of sensing the capacitor voltage comprises indirectly sensing the voltage of the storage capacitor.

16. The method as recited in claim 15, wherein the step of sensing the capacitor voltage further comprises the steps of:

waiting a predetermined decay interval of time that is sufficient to permit the storage capacitor voltage to decay below its level at the beginning of the decay interval; and charging the storage capacitor for a relatively brief charging interval and detecting the voltage of the storage capacitor.

17. The method as recited in claim 13, wherein the photographic camera further includes a high-voltage power converter having a primary winding and a secondary winding, wherein the primary winding is coupled to a relatively low voltage power source and the secondary winding provides a relatively high voltage to the storage capacitor, and wherein the step of sensing the capacitor voltage further comprises the steps of:

waiting a predetermined decay interval that is sufficient to permit the storage capacitor voltage to decay below its level at the beginning of the decay interval; and charging the storage capacitor for a relatively brief charging interval and detecting the voltage of the storage capacitor by detecting the voltage of the primary winding circuit.

18. The method as recited in claim 13, wherein the photographic camera further includes a high-voltage power converter having a primary winding and a secondary winding, wherein the primary winding is coupled to a relatively low voltage power source and the secondary winding provides a relatively high voltage to the storage capacitor, and wherein the step of sensing the capacitor voltage further comprises the steps of:

completing a voltage sensing circuit across the storage capacitor such that current will flow through the voltage sensing circuit until the voltage of the storage capacitor reaches the predetermined level; and producing a display control signal that indicates illumination of the display should be halted.

* * * * *